Figure 1:
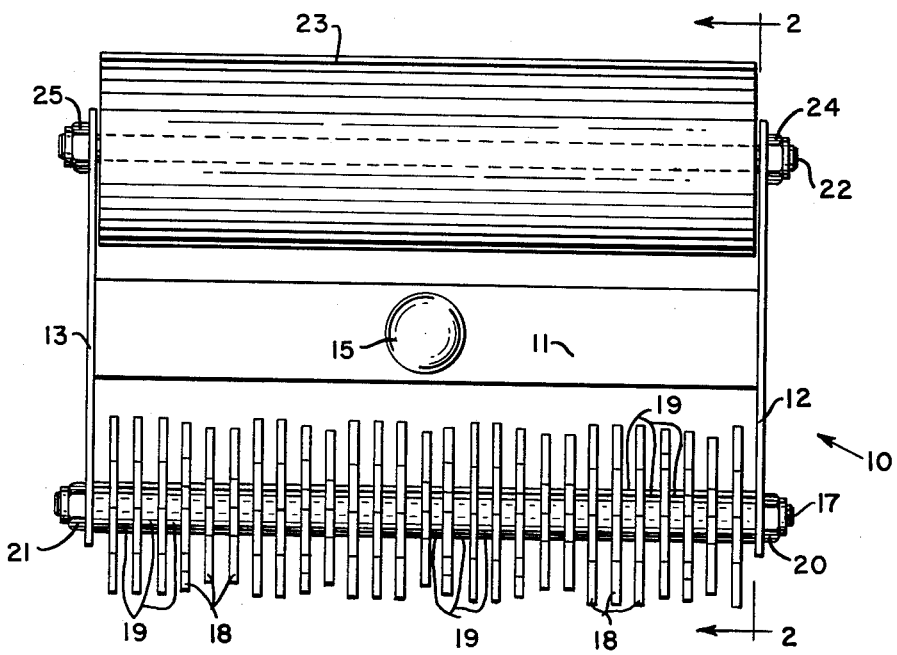

Nov. 6, 1962     D. E. BULLARD     3,062,300

CULTIVATOR

Filed April 28, 1960

INVENTOR.
DAVID E. BULLARD
BY
ATTORNEY.

3,062,300
CULTIVATOR
David E. Bullard, 39 Campbell Road, Fairfield, Conn.
Filed Apr. 28, 1960, Ser. No. 25,429
1 Claim. (Cl. 172—21)

The present invention relates to soil cultivating means, and particularly to a new and improved combined lawn spiker and roller.

The maintenance of lawns requires frequent patching of small areas on which, for one reason or another, the grass has died. These areas usually are neglected because of the effort required in cultivating them properly.

The principal object of the present invention is to provide a tool of unitary construction that will completely effect the proper cultivation of such areas with a minimum of effort.

Another object of the invention is to provide a combined spiker and roller of unitary construction that will be simple to construct and easy to operate.

Still another object of the invention is to provide such a combined unitary tool in which each element cooperates with the other in producing the results to be accomplished.

Another object of the invention is to provide such a unitary combined cultivating tool in which one of its active positions spikes the lawn, and another active position rolls the lawn.

In one aspect of the invention, a sheet metal frame member of generally H-shape may be provided with a socket connector on the bar joining the legs of the H-shaped frame, for the reception of a handle such as a rake handle or the like.

A shaft joining the legs of the H-shaped frame and parallel with the central bar thereof is shown as located at the extremities of the legs. One of these shafts supports a plurality of star-shaped disks with spacers therebetween, and each of which disks is freely rotatable on the shaft independently of the others.

A roller is shown as journaled on the other shaft, and it may be of any material such as wood, metal and the like.

In use, the unitary tool is positioned so that the star-shaped disks contact the ground and the handle extends angularly relatively to the ground when in the hands of the user. This locates the roller above the star-shaped disks so that its weight combines with the force applied by the user in causing the points of the star-shaped disks to penetrate the surface of the ground. By applying a vigorous reciprocating motion to the tool, the points of the star-shaped disks penetrate the affected area to a depth of several inches, and the reciprocating action causes the soil to be finely broken up and adequately aerated. Then by sprinkling grass seed on top of the cultivated affected area, it is ready for reversal of the tool so that the roller contacts the ground and the star-shaped disks are located above it, adding their weight to the force applied by the user to roll the cultivated, seeded area.

The above, other objects and novel features of the invention will become apparent from the following specification and accompanying drawing which is merely exemplary.

Figure 2:
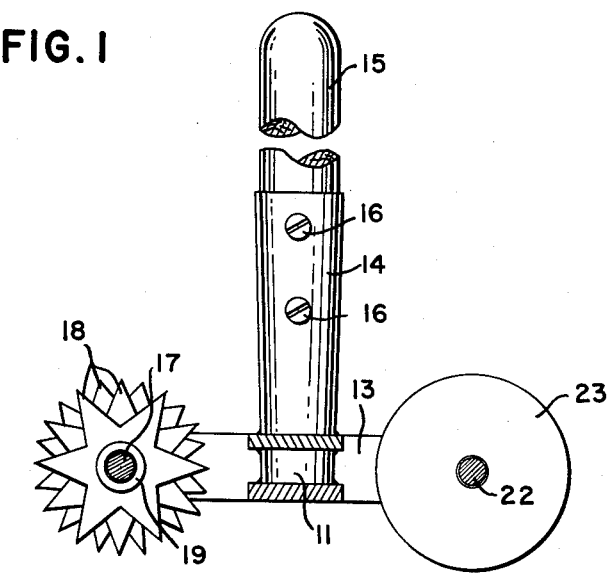

In the drawings:

FIG. 1 is a top plan view of a unitary tool to which the principles of the invention have been applied; and FIG. 2 is a sectional elevational view taken substantially along line 2—2 of FIG. 1.

Referring to the drawing, the principles of the invention have been shown as applied to a frame 10 including a cross bar 11. Legs 12 and 13 are shown as connected to the cross bar 11 forming therewith the generally H-shaped frame 10. Centrally of the cross bar 11, a socketed member 14 (FIG. 2) is shown as integrally joined at substantially a right angle to the bar 11. One end of a handle 15 is received within the socketed member 14 and held thereto by screws 16.

A shaft 17, threaded at each end, extends between the legs 12 and 13, at the one end thereof, and in parallel relation to the cross bar 11. Pointed disks 18 are located along the shaft 17 between the legs 12 and 13. Spacers 19 are located between adjacent disks 18 and between the legs 12, 13 and the first and last disk 18, respectively. Nuts 20 and 21 are threaded onto the ends of shaft 17 to retain the assembly in proper relation and such that each disk 18 freely rotates on the shaft 17 independently of the others.

Another shaft 22 that is threaded at its opposite ends extends between the legs 12 and 13 at the ends opposite those supporting the shaft 17. A roller 23 is journaled on the shaft 22 between the legs 12 and 13. Nuts 24 and 25 are threaded onto the threaded ends of shaft 22 to retain the assembled roller in proper position.

From the foregoing it is evident that with the handle 15 being substantially at right angles to the plane including the longitudinal axes of the shafts 17 and 22, use of the cultivator ensures only the star-shaped disks contacting the ground with the weight of the roller serving to combine with the force applied to the handle 15 by the user to assist in causing the disks to penetrate the ground; and, when the roller engages the ground in use, the weight of the assembly of star-shaped disks combines with the force applied to the handle 15 to assist the rolling effect of the roller. In other words, since it is desirable to sow the seed after churning of the earth and prior to rolling, either but not both the star-disks or roller can be used at one time.

Although the various features of the new and improved unitary cultivating tool have been shown and described in detail to fully disclose one embodiment of the invention, it will be evident that changes may be made in such details and certain features may be used without others without departing from the principles of the invention.

What is claimed is:

In a unitary cultivator, a frame comprising a cross bar having parallel legs at each end thereof forming a generally H-shaped frame; shafts mounted on said frame between said legs in parallel relation to each other, the longitudinal axe of said shafts and said cross member lying in a single plane; a plurality of pointed disks journaled on one of said shafts between said legs; spacers between said disks; a roller journaled on said other shaft; and a handle connected to said cross member and extending therefrom at a substantially right angle to the plane including the longitudinal axes of said shafts.

References Cited in the file of this patent

UNITED STATES PATENTS

| | | |
|---|---|---|
| 295,922 | Hood | Apr. 1, 1884 |
| 607,383 | Loree | July 12, 1898 |
| 1,320,875 | Lesh | Nov. 4, 1919 |
| 1,370,219 | Miller | Mar. 1, 1921 |
| 1,704,986 | Marcy | Mar. 12, 1929 |
| 1,950,851 | Konrad | Mar. 13, 1934 |
| 2,250,075 | Werb | July 22, 1941 |